United States Patent
Aue

(10) Patent No.: US 9,525,240 B2
(45) Date of Patent: Dec. 20, 2016

(54) ARRANGEMENT FOR CONTACTING A SCREEN OF AN ELECTRICAL HIGH VOLTAGE CABLE

(71) Applicant: NEXANS, Paris (FR)

(72) Inventor: Volker Aue, Dortmund (DE)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/546,104

(22) Filed: Nov. 18, 2014

(65) Prior Publication Data
US 2015/0140864 A1    May 21, 2015

(30) Foreign Application Priority Data

Nov. 19, 2013  (EP) .................................... 13306578

(51) Int. Cl.
| H01R 13/648 | (2006.01) |
| H01R 4/64 | (2006.01) |
| H01R 9/03 | (2006.01) |
| H01R 9/05 | (2006.01) |
| H01R 13/59 | (2006.01) |
| H02G 3/06 | (2006.01) |

(52) U.S. Cl.
CPC ............ *H01R 13/648* (2013.01); *H01R 4/646* (2013.01); *H01R 9/034* (2013.01); *H01R 9/0524* (2013.01); *H01R 13/59* (2013.01); *H02G 3/0666* (2013.01)

(58) Field of Classification Search
USPC ............................... 439/607.41, 607.44, 584
See application file for complete search history.

(56) References Cited

U.S. PATENT DOCUMENTS

| 2,498,589 | A | * | 2/1950 | Steinke | .................. | H01R 13/53 |
| | | | | | | 174/21 C |
| 3,107,135 | A | * | 10/1963 | Keil | ..................... | H01R 9/0521 |
| | | | | | | 174/75 C |
| 3,708,781 | A | * | 1/1973 | Trompeter | ........... | H01R 9/0521 |
| | | | | | | 174/89 |
| 3,924,920 | A | * | 12/1975 | Moscioni | ............... | H01R 4/646 |
| | | | | | | 439/781 |
| 7,737,362 | B2 | * | 6/2010 | Ogura | ................ | H01B 11/1895 |
| | | | | | | 174/102 R |
| 7,811,133 | B2 | * | 10/2010 | Gray | ..................... | H01R 9/0527 |
| | | | | | | 439/584 |
| 8,721,365 | B2 | * | 5/2014 | Holland | ............... | H01R 9/0524 |
| | | | | | | 439/584 |

FOREIGN PATENT DOCUMENTS

| DE | 3131274 | 2/1983 |
| DE | 2445898 | 2/1985 |

* cited by examiner

*Primary Examiner* — Tho D Ta
(74) *Attorney, Agent, or Firm* — Sofer & Haroun, LLP

(57) ABSTRACT

An arrangement for contacting an electrical screen includes an armature that has at least two ring shaped contact elements, a first contact element, and a second contact element which, in the assembly position, are connected to each other by a screw connection. The first contact element has a conical outer surface which widens toward the end of the high voltage cable and surrounds the cable strand of the high voltage cable. The second contact element is attached to parts of the screw connection and has a conical inner surface which also widens toward the end of the high voltage cable and which extends in the assembly position parallel to the outer surface of the first contact element.

6 Claims, 3 Drawing Sheets

ARRANGEMENT FOR CONTACTING A SCREEN OF AN ELECTRICAL HIGH VOLTAGE CABLE

RELATED APPLICATION

This application claims the benefit of priority from European Patent Application No. 13 306 578.9 filed on Nov. 19, 2013, the entirety of which is incorporated by reference.

BACKGROUND

Field of the Invention

The invention relates to an arrangement for contacting a screen containing aluminum which is circumferentially surrounded over the entire length of the high voltage cable, wherein the screen is at least clamped over one end of the high voltage cable between portions of a fitting consisting of metal. Such an arrangement is disclosed, for example, in DE 24 45 898 C2.

Description of Related Art

High voltage cables generally have an inner cable strand and, separated therefrom by a buffer layer, an outer cable strand, in the following called "screen" for short, which is generally grounded. The screens are generally formed by aluminum foils closed around the cable strand or by a plurality of wires of copper and, to an increasing extent, of aluminum. An electrically conductive connection of such a high voltage cable to, for example, the housing of an electric fitting or another high voltage cable requires that the cable strands as well as the outer screen are contacted.

The connection of the screen generally is effected by means of electric welding. In this connection, this requires a significant know-how by the personnel and a significant knowledge of the technical devices in order to ensure a reliable connection which is capable of transmitting current without undue loading of the screen and the insulation.

DE 31 31 274 C2 shows a ground connection for layers, jackets or the like of an electrical cable whose end portion is bent back outwardly in the form of individual casings or screen strips and is clamped between two contact rings which have been pushed onto the casing or screen from the cable end. In this connection, an inner spring ring and an outer structurally stable contact ring are provided which are constructed conically relative toward each other and the metal layer cut into metal strips, wherein the contact rings may have a configuration which penetrates the aluminum outside layer, or a knurling or a roughness.

The above mentioned DE 24 45 898 C2 has a connection of a grounding screen of an energy cable in which the screen, manufactured of aluminum or an aluminum alloy, is cut several times axially and bent for forming longitudinal strips. The connecting flags formed in this manner are bent rearward and are clamped between two disks with contact surfaces arranged obliquely relative to the screw axis. Such contacting devices are relatively complicated and the mechanical loads acting on the screen are significant.

OBJECTS AND SUMMARY

The invention is based on the object of constructing the above described arrangement in such a way that the screen of a high voltage cable can be contacted safely and electrically with relatively little effort.

This object is met in accordance with the invention in that the armature has at least two ring shaped contact elements, namely, a first contact element and a second contact element, which in the mounted position are connected to each other by a throughconnection, the first contact element has a conical outer surface which widens toward the end of the high voltage cable, and surrounds the cable strand of the high voltage cable, the second contact element is mounted on parts of the screw connection and has an inner surface which also expands conically toward the end of the high voltage cable, wherein, in the mounted position the contact element extends parallel to the outer surface of the first contact element, at least a portion of the screen is, in the mounted position, clamped between the conical surfaces of the two contact elements which extend parallel to each other, and at least the conical inner surface of the second contact element has structures for increasing its roughness.

As a result of this configuration, a contacting device with at least two contact elements is provided, of which a first contact element has a conical outer surface and a second contact element has a conical inner surface. The inner surface and the outer surface expand conically, different from the contacting devices of the prior art mentioned above, from the receiving opening of the contacting device toward the other end, i.e. the conical inner surface and the conical outer surface conically widen toward the cable end of the received cable.

The direction in which the contacting device is placed on the cable, is referred to in the following as the assembly direction.

In an embodiment with only two contact elements, the end areas of the screen are clamped and contacted, particularly between the conical outer surface of the first contact element and the conical inner surface of the second contact element.

The invention is based on the concept of receiving the end areas of the screen between two surfaces which widen conically toward the cable end. Consequently, it is no longer necessary to expand the end portions of the screen by more than 90° toward the rear or in the assembly direction. Rather, it is sufficient to slightly expand the end portions of the screen.

Accordingly, since the end areas of the screen are only slightly expanded, a gentle treatment of the material of the screen is possible. It has been found that this is particularly also true when the screen is configured of wires, i.e. in the form of a wire screen, particularly wires with a greater bending angle are subjected to greater loads.

Consequently, in accordance with the invention, a uniform contacting device can be used for screens of metal foil or wires.

In spite of the small expansion, a secure clamping action can be achieved between the oppositely directed surfaces by advantageously providing clamping means directly at the contact elements. In this regard, particularly screws, which are placed by means of at least one of the contact elements, have been found to be effective and easily operated clamping means. For example, the screws can be pushed through a second contact element, constructed as a clamping ring and having a conical inner surface, and the screws are received in threaded bores of the first contact element. Consequently, only some of the screws distributed over the circumference have to be tightened in order to achieve a uniform and secure clamping action. In this regard, the screws ensure with little effort a secure electrical connection of the end areas to the two contact elements and, also to the two contact elements relative to each other.

The contacting device is constructed relatively small and space saving since the second contact element, preferably constructed as outer clamping rings, can be pushed substantially onto the first contact element. The angle of inclination of the conical inner surface and outer surface, i.e. the angle of opening of the cone relative to the axial direction can be for example, in a range of below 45°, particularly below 30°. It has been found that a clamping or pressing of the end areas of the screen, i.e. the metal strips or individual wires, under such a flat angle is advantageous because that under such a flat angle a relatively high sliding movement of the outer second contact element and thus, a substantial abrasion of the possibly interfering aluminum oxide layer and, moreover, a secure contact over a large area is obtained.

As a supplemental feature, the inner surface and the outer surface advantageously have structures for increasing the contact surfaces and for destroying an aluminum oxide layer.

In this regard, a conical inner surface and conical outer surface are understood to be surfaces whose width decreases or increases in the axial direction, wherein also deviations from a circular cross section are possible, particularly in cable strands whose cross section is not precisely circular. The conical surfaces preferably extend completely in the circumferential direction around the axis. Also basically conceivable are constructions of the conical surfaces whose width does not increase or decrease in the axial direction, however, a linear construction is advantageous because this results in contact over a large area and a sliding movement when clamping for penetrating the aluminum oxide layer.

In addition to embodiments with only two contact elements, for screens with a metal band screen as well as a wire screen, it is also possible to provide more than two, particularly three contact elements. The contacting device with three contact elements preferably has a third contact element with a conical inner surface as well as a conical outer surface, which is provided to supplement the second contact element serving as a clamping ring and the first contact element of the embodiments with only two contact elements. Together with the first contact element and the second contact element, the third contact element makes possible separate clamping connections to the metal band screens on the one hand, and to the wire screen, on the other hand.

Consequently, even when constructing a cable connection with three contact elements, high safety can be ensured because the clamping action of the metal band screen, as well as of the wire screen, facilitate separate clamping directions. For this purpose, for example, separate clamping directions can be used. For example, separate screws can be provided for each of the contact connections.

Consequently, a set of several contact elements can be formed, either with a similar functionality as well as also the same functionality. In this connection, configurations are also possible in which optionally two or three contact elements can be selected for constructing a suitable screen connection.

In the method according to the invention, after removing the outer insulation, the second contact element is pushed on from the cable end, i.e. in the assembly direction. Subsequently, the plurality of individual end areas of the screen, i.e. metal strips formed by axial slots or individual wires, are placed on the conical outer surface of the first contact element and the first contact element in the assembly direction, i.e. from the cable end.

Consequently, in contrast to bending procedures with a bending angle of more than 90°, the assembly is made significantly simpler. The screen ends can be placed essentially by themselves onto the conical outer surface. Subsequently, the second contact element is pushed against the assembly direction, i.e. toward the cable end onto the ends of the screen and is clamped together while destroying a possibly provided aluminum oxide layer which can advantageously be carried out by a simple tightening of the screws.

BRIEF DESCRIPTION OF THE DRAWINGS

In the following, the invention will be explained with the aid of the drawings showing various embodiments.

In the drawing.

DETAILED DESCRIPTION

Figure 1:
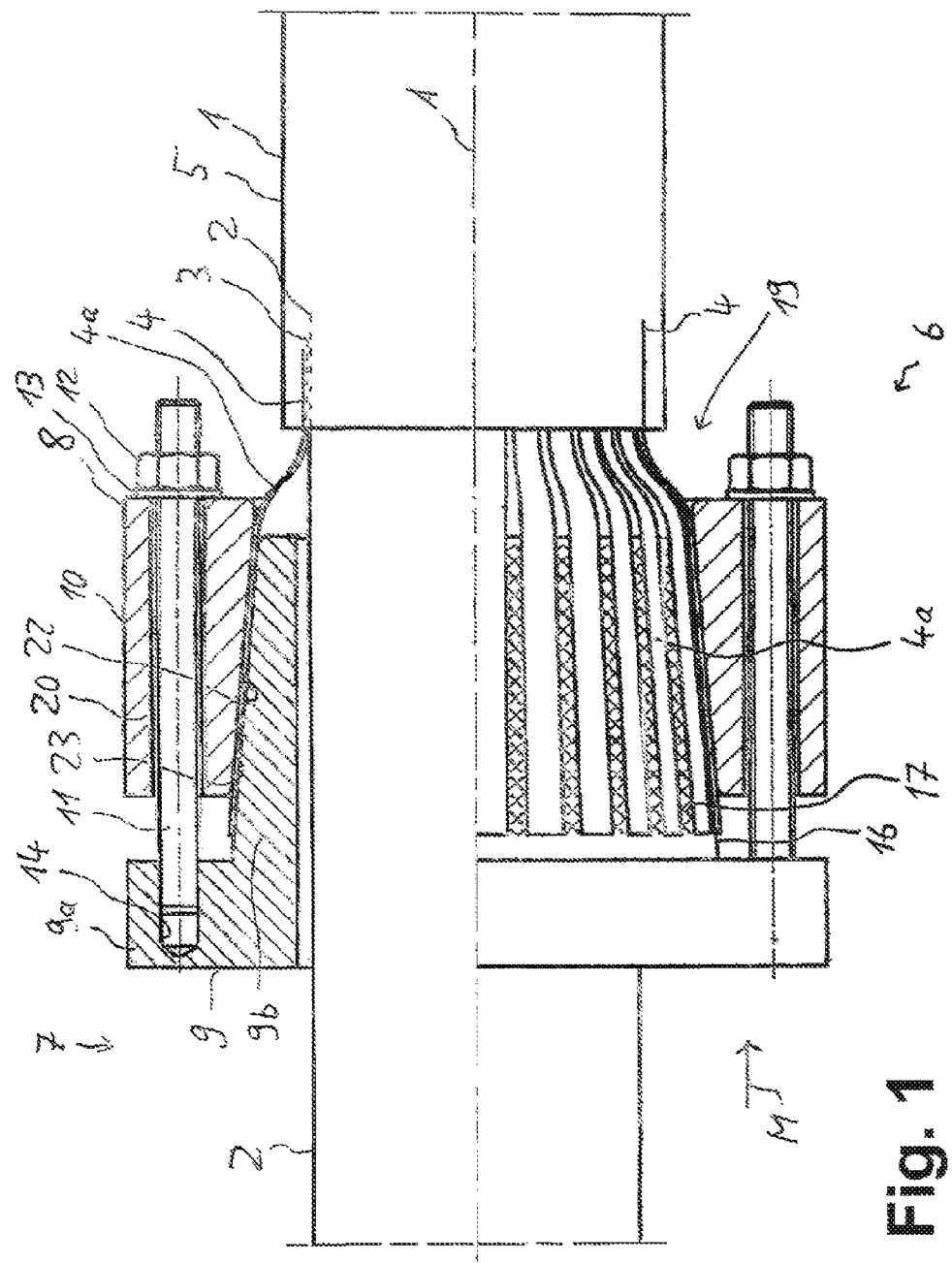
FIG. 1 shows a screen connection with a contacting device according to a first embodiment for connecting a screen constructed of a metal band.

A high voltage cable 1 includes an inner cable strand 2 and an aluminum band 4 constructed separately as a screen through an insulating buffer layer 3, as well as an outer insulation 5. The high end voltage cable 1 is in its totality preferably flexible so that also its components, i.e. the cable strand 2, the buffer layer 3, the aluminum band 4 and the outer insulation 5, are also flexible.

The high voltage cable 1 is connected in a screen connection 6 to an electrical device 7 which may be, for example, another high voltage cable or a set of electrical devices. The screen connection 6 serves for contacting the aluminum band 4 serving as the screen. The cable strand 2 is additionally connected or attached through a set of cables, not illustrated in the drawings. The assembly device M extends from the cable end away to the right in FIG. 1.

The screen connection 6 is essentially formed by a contacting device 8 which is constructed radially outside of the cable strand 2, namely as an arrangement extending circumferentially in axial direction, and a first contact element 9 and a second contact element 10 and connecting means 11, 12, 13, here screws 11, possibly with nut 12 and, for example, has washers 13. The first contact element 9 has a connecting area 9a, for example, with threaded bores constructed as first screw holes 14 to receive the screws 11, and a contact area 9b on which is a conically shaped outer surface 16, whereby the conical outer surface 16 in the mounting direction M away from the cable end, is conically tapered. The first screw holes 14 here are as blind end bores constructed with inner threads. On the conical outer surface 16 is a structuring 17, for example, formed as roughening, or through perforating or grooving to increase the roughness and the effectiveness of the upper surface. The second contact element 10 has a second screw hole 20, here as a throughhole without threading, and a conical inner surface 22, which also advantageously is constructed with a structuring 23 for increasing the roughness and effectiveness of the upper surface.

The aluminum band 4 inside the high voltage cable 1 is advantageously constructed as closed aluminum foil which surrounds the cable strand 2 in a tube shape. In the area of the screen connection 6, the aluminum bands 4 are divided in the end area, received here in the direction of the metal strips 4a extended in the direction of the metal strips 4a, which by exiting out of the outer insulation 5 are somewhat radially bent facing out and between the conical outer surface 16 of the first contact element 9 and the conical inner surface 22 of the second contact element. The screws 11 serve as clamping devices which act as a clamping ring which stretches to span outer second contact element 10 on and against the first contact element 9, whereby the structuring 17, 23, in doing so eventually builds an aluminum oxide layer on the metal strips 4a, which can impair or hinder the electrical contact.

A receiving opening 19 of the contacting device 8 to receive the high voltage cable 1 is consequently in FIG. 1 provided in the right area of the contacting device. The high voltage cable 1 is guided from the right in the receiving opening 19, which is defined through the second contact element 10, since the mounting direction M for the contacting device 8 is to the right.

For constructing the screen connection 6, initially the outer insulation 5 is shortened or an end portion thereof is removed, and the aluminum band 4 is divided into metal strips 4a. The second contacting element 10 is before or after structuring of the end area pushed with its receiving opening 19 in the assembly direction M onto the high voltage cable 1. The first contact element 9 is then pushed on in the assembly direction M and the metal strips 4a are then placed on the conical outer surface 16. The second contact element 10 is pushed against the assembly direction M onto the metal strips 4a and the arrangement is tensioned by means of the screws 11.

The two contact elements 9 and 10 and the screws 11 are thus connected electrically to the aluminum band 4 serving as grounding. In this connection, the first contact element 9 may also be a part of a housing of the additional electrical device 7.

Figure 2:
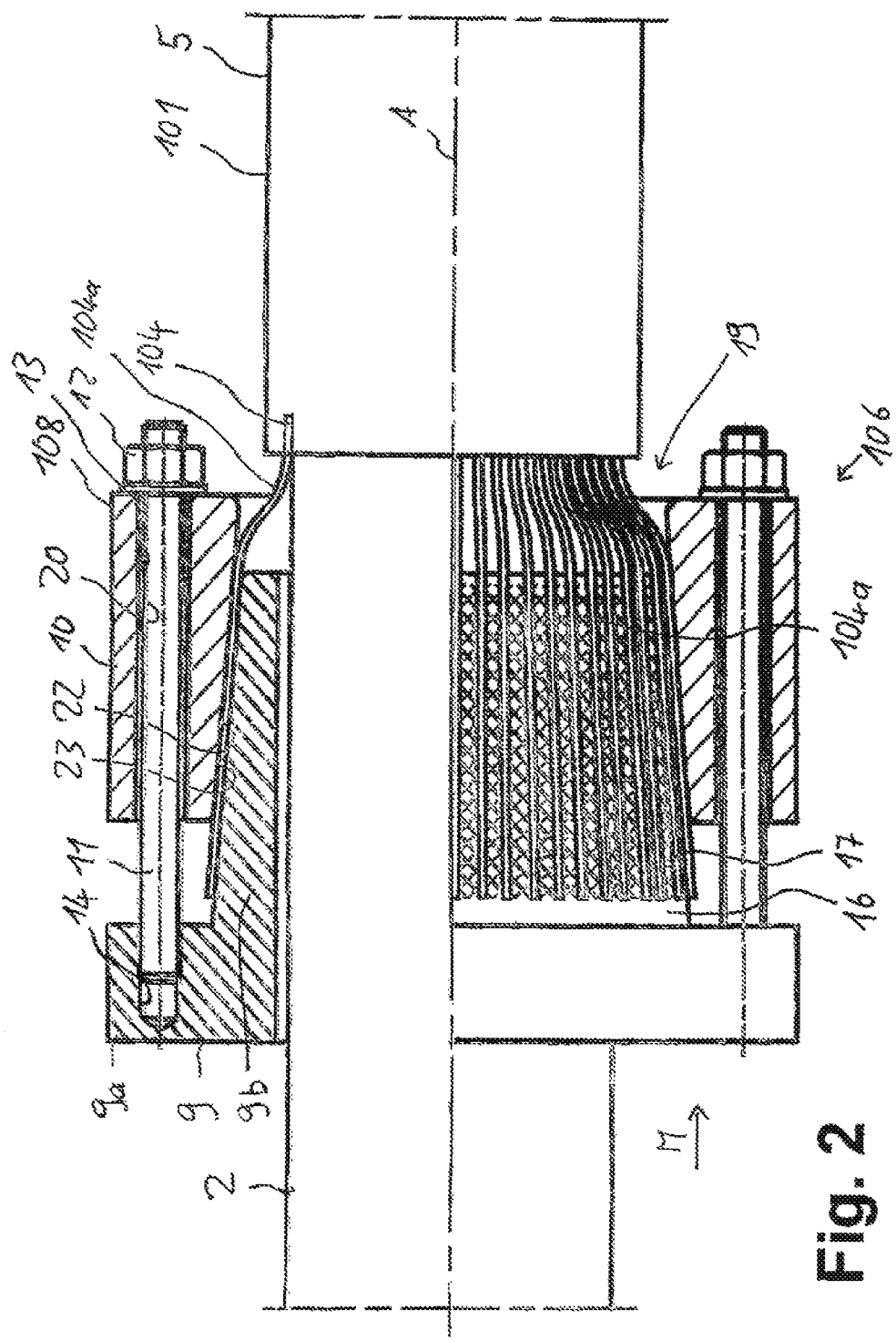
FIG. 2 shows a screen connection according to a second embodiment for connecting a wire screen.

FIG. 2 shows another embodiment which is provided for a high voltage cable 101 which, with the construction being otherwise the same construction as a screen, shows a wire screen 104 of individual wires 104a. Corresponding to the metal strips 4a of the embodiment of FIG. 1, the individual wires 104a are bent as end areas radially upwardly and are clamped to a small extent and are clamped between the conical surface 16 of the first contact element 9 and the conical inner surface 22 of the second contact element 10. Accordingly, for the high voltage cable 101 the same contacting device 8 can be used as in the embodiment of FIG. 1.

Figure 3:
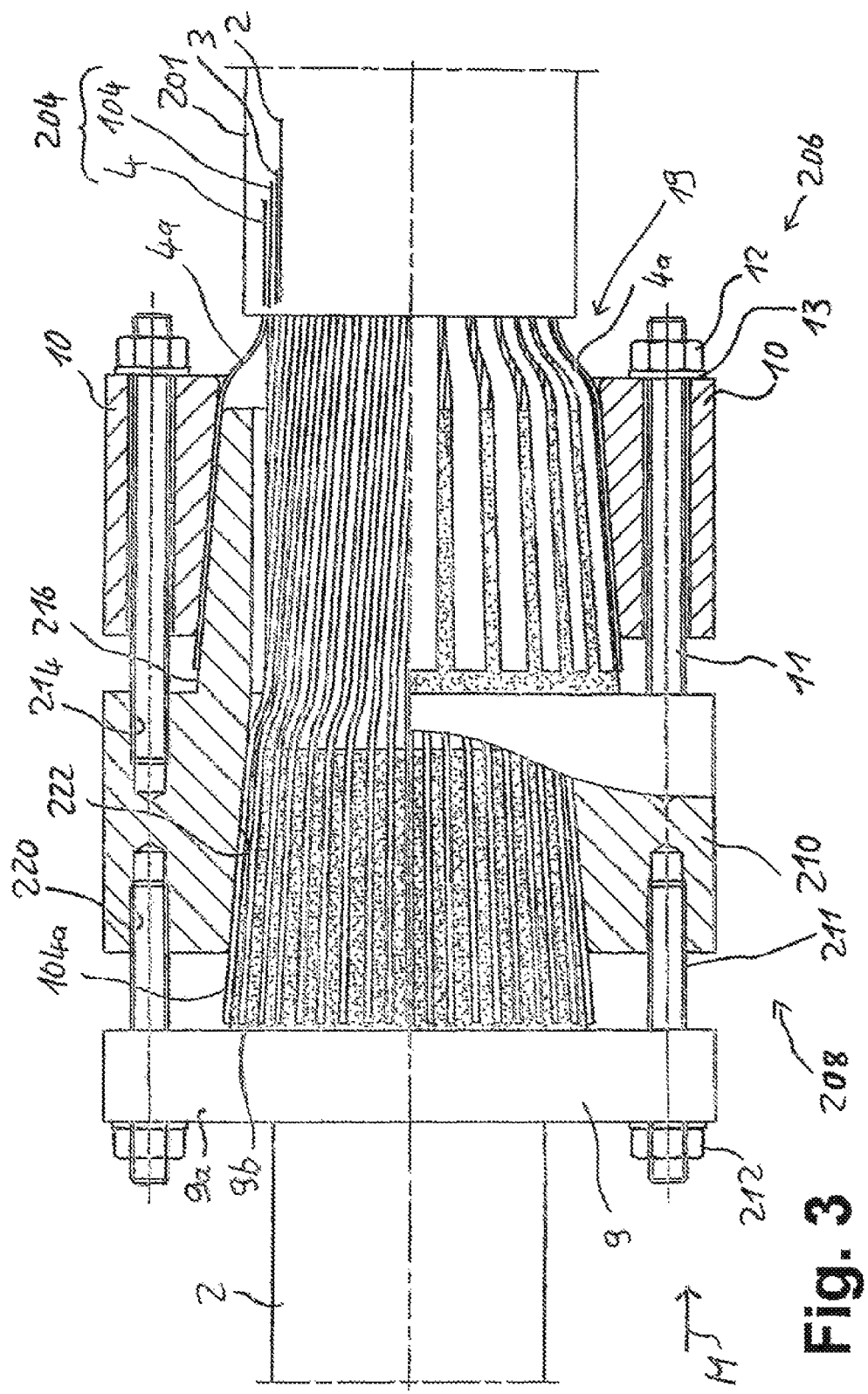
FIG. 3 shows a screen connection according to a third embodiment for connecting a cable screen formed of a wire screen and a metal band.

FIG. 3 shows another embodiment which serves for a connection of a high voltage cable 201 which, with otherwise the same construction as in FIGS. 1 and 2, as a screen 204 which has an aluminum band (metal band) 4 as well as a wire screen 104 with individual wires 104a, wherein the wire screen 104 and the aluminum band 4 are generally connected electrically to each other. In the embodiment of FIG. 3, a contacting device 208 is provided which includes a first contact element 9, a second contact element 10, as well as additionally a third contact element 210 which has a conical inner surface 222 as well as a conical outer surface 216 and further first screw holes 214 and second screw holes 220, for example, in the form of blind end bores with internal threads. The third contact element 210 is arranged, corresponding to the embodiment of FIG. 3, as an intermediate element which is located between the first contact element 9 and the second contact element 10. The second contact element 10 is constructed preferably corresponding to the embodiment of FIGS. 1 and 2. The first contact element 9 may basically also be constructed in accordance with FIGS. 1 and 2, however, in this case with throughholes for receiving two screws 211 which are screwed into the second screw holes 220 of the third contact element 210.

The third contact element 210 is additionally attached and connected through the first screws 11, corresponding to the first and second embodiments, to the second contact element 10 and further through the second screws 211 and nuts 212 to the first contact element 9. Therefore, the metal strips 4a can be received corresponding to the embodiment FIG. 1 between the conical inner surface 22 of the second contact element 10 and the conical outer surface 216 of the third contact element 210 and the individual wires 104a can be received between the conical outer surface 16 of the first contact element 9 and the conical inner surface 222 of the third clamping element 210, wherein the inner surfaces advantageously have structures as described above. Thus, the clamping connections through the first screws 11 and the second screws 211 take place independently of each other.

As a result, a screen connection 206 is created in which a plurality of layers of the screen 204, arranged radially one above the other, are contacted axially offset relative to each other.

In all embodiments the respective high voltage cable 1, 101, 201, can be connected to another corresponding high voltage cable by having a construction according to FIG. 1, 2 or 3 connected to each other toward the left, preferably in a mirror inverted manner.

The invention claimed is:

1. Arrangement for contacting an aluminum containing electrical screen, said screen circumferentially surrounding a cable strand over the entire length of a high voltage cable, said arrangement comprising:
   a metal fitting, configured such that said screen of said high voltage cable can be clamped over one end of the high voltage cable between portions of said fitting made of metal, wherein:
   the fitting has at least two ring shaped contact elements, a first contact element and a second contact element which are connected to each other in an assembly position through screw connections,
   that the first contact element has a conical outer surface which widens conically toward an end of the high voltage cable and surrounds the cable strand of the high voltage cable,
   that the second contact element is mounted on parts of said screw connections and has an inner surface which also widens conically toward said end of the high voltage cable which extends, in the mounted position, parallel to the outer surface of the first contact element,
   that at least a part of the screen, the end portions of which are widened conically is clamped in the mounted position between the conical surfaces of the two contact elements which extend parallel to each other, and
   that at least the conical inner surface of the second contact element has structures for increasing its roughness.

2. Arrangement according to claim 1, wherein said arrangement is configured to work in conjunction with said screen when said screen is composed of two layers, an outer layer and an inner layer, of electrically conductive material which are arranged one above the other.

3. Arrangement according to claim 2, wherein the outer layer of the screen is composed of an aluminum band which surrounds said cable strand of said high voltage cable as a circumferentially closed tube and which is severed by axially extending cuts so as to form strips at the end of the high voltage cable.

4. Arrangement according to claim 2, wherein the inner layer of the screen has wires which are roped around said cable strand of said high voltage cable.

5. Arrangement according to claim 1, wherein
a third contact element is connected through a screw connection to the first contact element which has a conical outer surface which extends in the assembled position parallel to the conical inner surface of the second contact element and has a conical inner surface which in the mounted position extends parallel to the conical outer surface of the first contact element, and
in the mounted position, the wires of the inner layer of the screen are clamped between the conical outer surface of the first contact element and the conical inner surface of the third contact element, while an aluminum band is clamped between the conical outer surface of the third contact element and the conical inner surface of the second contact element.

6. Arrangement according to claim 1, wherein the conical inner surfaces and conical outer surfaces of the first contact element and second contact element have structures for increasing their roughness.

\* \* \* \* \*